_United States Patent Office_

3,002,976
Patented Oct. 3, 1961

3,002,976
1-(2-THIENYL)-ω-(4-ARYLPIPERAZINE)ALKANOLS
Paul A. J. Janssen, Antwerpse Steenweg 16, Vosselaar,
near Turnhout, Belgium
No Drawing. Filed Oct. 12, 1959, Ser. No. 845,629
7 Claims. (Cl. 260—268)

The present invention relates to a new group of thienyl-alkylpiperazine derivatives and more particularly to 1-(2-thienyl)-ω-(4-arylpiperazine)alkanols of the general formula

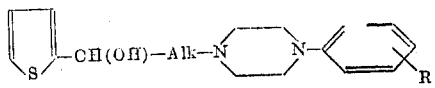

and the pharmaceutically acceptable non-toxic salts thereof, wherein Alk is a lower alkylene radical and R is a member of the class consisting of hydrogen, methyl, and halogen.

The radical Alk is a lower alkylene radical such as methylene, ethylene, propylene, butylene, trimethylene, tetramethylene, pentamethylene, and hexamethylene. Radicals of 3-4 carbon atoms are preferred. The halogen can represent fluorine, chlorine, and iodine.

A preferable process for the preparation of these compounds employs the reduction of a ketone of the structural formula

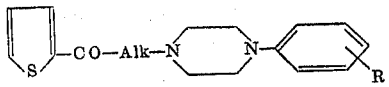

wherein R and Alk are defined as above with a metal hydride of the type (Alkali metal)ZH₄ in which Z is an element of periodic group III of an atomic number less than 14.

Another useful procedure for the preparation of these compounds employs the alkaline hydrolysis (for example, using sodium hydroxide) of a halogen compound of the structural formula

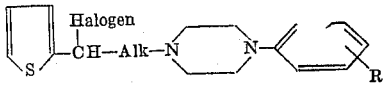

wherein Alk and R are defined as above. The hydrohalide salt of the compound is formed by the addition of 3 molecular equivalents of a hydrogen halide to the corresponding thenylidene compound in acetic acid.

The compounds can also be prepared by the condensation of a compound of the type

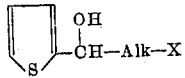

with a compound of the type

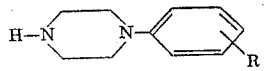

In this reaction R and Alk are defined as above and X is a readily replaceable electro-negative group, e.g. halogen, arylsulfonoxy group or an alkylsulfonoxy group.

The compounds of this invention are central nervous system depressants. More particularly they are tranquilizers, barbiturate potentiators, and analgesics.

The organic basis of this invention form pharmaceutically useful non-toxic salts with a variety of inorganic and strong organic acids including sulfuric, phosphoric, hydrochloric, hydrobromic, hydriodic, sulfamic, citric, lactic, maleic, malic, succinic, tartaric, cinnamic, acetic, benzoic, gluconic, ascorbic, and related acids. They also form quaternary ammonium salts with a variety of organic esters of sulfuric, hydrohalic, and aromatic sulfonic acids. Among such esters are methyl chloride and bromide, ethyl chloride, propyl chloride, butyl chloride, isobutyl chloride, benzyl chloride, and bromide, phenethyl bromide, naphthylmethyl chloride, dimethylsulfate, diethylsulfate, methyl benzenesulfonate, ethyl toluenesulfonate, ethylene chlorohydrin, allyl bromide, methallyl bromide, and crotyl bromide.

The compounds which constitute this invention and the methods for their preparation will appear more fully from a consideration of the following examples, which are given for the purpose of illustration only and are not to be construed as limiting the invention in spirit or in scope. In these examples quantities are indicated as parts by weight, temperatures are expressed in degrees centigrade (°C.), and pressures are expressed in millimeters of mercury (mm.).

_Example 1_

A mixture of 10 parts of 2-(β-chloropropionyl)thiophene and 16.2 parts of 1-phenylpiperazine is stirred in a flask under cooling. After the reaction mixture solidifies, the contents are boiled with 500 parts of water and 600 parts of ether. The ethereal solution is separated, dried over anhydrous potassium carbonate, filtered, and evaporated until a precipitate is formed. The precipitate is collected on a filter to yield 1-[β-(2-thenoyl)ethyl]-4-phenyl-piperazine melting at about 66–68° C.

To a solution of 4 parts of 1-[β-(2-thenoyl)ethyl]-4-phenylpiperazine in 120 parts of absolute ethanol, is added portionwise 0.15 part of sodium borohydride at 18° C. Stirring is continued for 3 hours. The mixture is decomposed with 250 parts of 2-N hydrochloric acid, cooled to 13° C., and made alkaline with dilute sodium hydroxide. The milky precipitate formed is crystallized on standing, filtered, and dissolved in ether. After concentrating to a small volume and cooling at 0° C., a precipitate is formed which is filtered and dried to yield the white crystalline 1-(2-thienyl)-3-(4-phenylpiperazine)-propanol melting at about 97.4–98.8° C. The compound has the structural formula

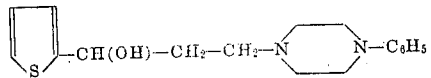

_Example 2_

A mixture of 84 parts of anhydrous thiophene, 141 parts of γ-chlorobutyryl chloride and 870 parts of anhydrous benzene is cooled to 0 to —5° C. While this temperature is maintained, 260 parts of stannic chloride are added slowly over a 2 hour period. After the addition is complete, the cooling bath is removed and the stirring is continued for about an hour. The reaction mixture is then poured into a mixture of 60 parts of concentrated hydrochloric acid and 450 parts of ice water. The organic layer is separated, washed with water, dried over anhydrous calcium chloride and filtered. The filtrate is concentrated under reduced pressure and the residue is distilled to yield 2-(γ-chlorobutyryl)thiophene which boils at 144–146° C. at 11 mm. of pressure.

In a bomb a mixture of 9.4 parts of 2-(γ-chlorobutyryl)thiophene, 16.2 parts of 1-phenylpiperazine, and 0.1 part of potassium iodide in 120 parts of toluene is heated for 72 hours at a temperature of 145–150° C. After cooling, the mixture is filtered and the filtrate is diluted with 800 parts of ether. Dry, gaseous hydrogen chloride is introduced into the solution, whereupon there is obtained the crude 1-[γ-(2-thenoyl)propyl]-4-phenylpiperazine dihydrochloride. The product is collected on a filter and purified by recrystallization from a mixture of acetone, 2-propanol and methanol. The white, crystalline precipitate decomposes at 203–205° C.

The free base of 1-[γ-(2-thenoyl)propyl]-4-phenylpiperazine dihydrochloride is liberated by dissolving 4 parts of the salt in water, making the solution alkaline, extracting the base with ether, drying the ethereal solution over potassium carbonate, and evaporating the solvent. To a solution of the residue in 120 parts of absolute ethanol, is added portionwise 0.03 part of sodium borohydride. The mixture is stirred for 150 minutes, decomposed with 100 parts of 2-N hydrochloric acid, diluted with 600 parts of water, and made alkaline. After cooling at 0° C., the precipitate formed is filtered and recrystallized from diisopropyl ether by chilling at −20° C. to yield the white crystals of 1-(2-thienyl)-4-(4-phenylpiperazine)butanol melting at about 91.4–93° C.

Example 3

While the flask is cooled with water, 8.7 parts of 2-(β-chloropropionyl)thiophene and 17.6 parts of 1-(3-methylphenyl)piperazine are stirred. The mixture is maintained at room temperature for 65 hours. The mixture solidifies and the solid is boiled with 600 parts of ether and then filtered. The ethereal solution is washed with water, dried over anhydrous potassium carbonate, filtered, and evaporated. The residue is taken up in 200 parts of diisopropyl ether and then the solution is filtered and cooled. The 1-[β-(2-thenoyl)ethyl]-4-(3-methylphenyl)piperazine thus obtained is recovered by filtration and is found to melt at about 91–92° C.

To a solution of 3.8 parts of 1-[β-(2-thenoyl)ethyl]-4-(3-methylphenyl)piperazine in 120 parts of absolute ethanol is added 0.35 part of sodium borohydride portionwise. Stirring is continued for 4 hours. The mixture is cooled to 18° C., decomposed with 55 parts of 2-N hydrochloric acid, and filtered. The filtrate is made alkaline, and diluted with 450 parts of water. After chilling at 0° C. for 8 hours, the precipitate formed is filtered, washed, and dried to yield crude 1-(2-thienyl)-3-[4-(3-methylphenyl)piperazine]-1-propanol. After recrystallization from diisopropyl ether, the white amorphous powder of the pure compound melts at about 94–95° C.

Example 4

A mixture of 9.5 parts of 2-(γ-chlorobutyryl)-thiophene and 17.6 parts of 1-(3-methylphenyl)piperazine is heated in an open flask for 5 hours at a temperature of 105–110° C. After the contents of the flask are cooled to room temperature, 1000 parts of water and 800 parts of ether are added. The ether layer is separated, and the ethereal solution is dried over anhydrous magnesium sulfate, filtered, and evaporated. The residue is first recrystallized from a mixture of ethanol and water and then from a mixture of low-boiling petroleum ether and ethanol to yield 1-[γ-(2-thenoyl)propyl]-4-(3-methylphenyl)piperazine melting at about 74–76° C.

To a solution of 4 parts of 1-[γ-(2-thenoyl)propyl]-4-(3-methylphenyl)piperazine in 120 parts of absolute ethanol, is added 0.35 part of sodium borohydride portionwise. Stirring is continued for 4 hours at 26° C. The mixture is cooled to about 20° C., decomposed with 48 parts of 2-N hydrochloric acid, and filtered. The filtrate is made alkaline, diluted with a total volume of 600 parts, and cooled for 8 hours at 0° C. The precipitate formed is filtered and recrystallized from ether by chilling at 0° C. to yield the pale yellow granular powder of 1-(2-thienyl)-4-[4-(3-methylphenyl)piperazine]butanol melting at about 76–78° C. The compound has the structural formula

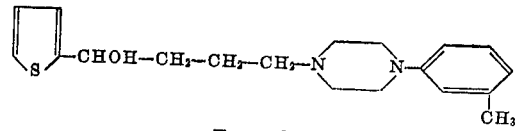

Example 5

A mixture of 9.5 parts of 2-(γ-chlorobutyryl)thiophene and 17.6 parts of 1-(4-methylphenyl)piperazine is heated in an open flask for 10 hours at a temperature of 105–110° C. The contents of the flask are cooled to room temperature and 160 parts of ether are added. The ethereal solution is washed with water, and then dried over anhydrous potassium carbonate. The solvent is evaporated and the product is recrystallized from ethanol and water to yield 1-[γ-(2-thenoyl)propyl]-4-(4-methylphenyl)piperazine melting at about 77.5–78.5° C. The dihydrochloride melts at about 211–216.5° C.

To a solution of 3.95 parts of 1-[γ-(2-thenoyl)propyl]-4-(4-methylphenyl)piperazine in 120 parts of absolute ethanol, is added portionwise, 0.6 part of sodium borohydride with stirring. The stirring is continued for 150 minutes at 20° C. The mixture is decomposed with 40 parts of 2-N hydrochloric acid, diluted with 600 parts of water and made alkaline with 50% sodium hydroxide. After cooling at 0° C. for 8 hours, the precipitate formed is filtered and recrystallized from diisopropyl ether by chilling at −20° C. to yield the white crystalline powder of 1-(2-thienyl)-4-[4-(4-methylphenyl)piperazine]-1-butanol melting at about 113–114° C.

Example 6

A mixture of 185 parts of bis(β-ethanol)amine and 177 parts of 1-amino-3-fluorobenzene is added to 280 parts of 12 normal hydrochloric acid. About 264 parts of water are evaporated and the remaining solution is rendered alkaline with 336 parts of 44% sodium hydroxide solution. This solution is extracted with chloroform. The organic layer is separated, dried over anhydrous potassium carbonate, filtered and fractionally distilled to yield 1-(3-fluorophenyl)piperazine boiling at about 145–155° C. at 3 mm. pressure.

A mixture of 8.7 parts of 2-(γ-chlorobutyryl)-thiophene and 17 parts of 1-(3-fluorophenyl)piperazine is heated for 10 hours at a temperature of 100–105° C. The reaction mixture is extracted with 750 parts of water and 600 parts of ether. The organic layer is separated, dried over anhydrous potassium carbonate, filtered and evaporated. The residue is taken up in ether and vacuum distilled nearly to dryness. The product is collected on a filter and recrystallized from diisopropyl ether to yield 1-[γ-(2-thenoyl)propyl] - 4 - (3 - fluorophenyl)piperazine melting at 68.2–70.2° C.

To a solution of 3 parts of 1-[γ-(2-thenoyl)-propyl]-4-(3-fluorophenyl)piperazine in 80 parts of absolute ethanol, is added portionwise, 0.04 part of sodium borohydride. After standing for 3 hours, the mixture is decomposed with 40 parts of 2-N hydrochloric acid, diluted with 600 parts of water, and made alkaline with 50% sodium hydroxide. After cooling at 0° C. for 8 hours, the precipitate formed is recrystallized from diisopropyl ether by chilling at −20° C. The light brown amorphous powder of 1 - (2 - thienyl)4-[4-(3-fluorophenyl)-piperazine]butanol melts at about 78–79° C.

Equimolar substitution of 1-amino-3-iodobenzene for 1-amino-3-fluorobenze in the above procedure yields 1-(2-thienyl)-4-[4-(3-iodophenyl)piperazine]-1-butanol of the structural formula

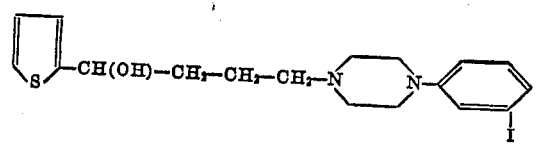

Example 7

A mixture of 157.7 parts of bis(β-ethanol)amine and 187.2 parts of 1-amino-4-fluorobenzene is introduced into a flask. The mixture is cooled on an ice bath, whereupon 325 parts of 12 normal hydrochloric acid are added portionwise. Approximately 290 parts of water are evaporated, and to the remaining solution are added 128 parts of sodium hydroxide solution. The solution is diluted with water and extracted with chloroform. The organic layer is separated, dried over anhydrous potassium carbonate, filtered, and fractionally distilled to yield 1 - (4 - fluorophenyl)piperazine boiling at about 105–120° C. at 1 mm. pressure.

In a sealed reactor a mixture of 9.4 parts of 2-(γ-chlorobutyryl)thiophene, 23 parts of 1-(4-fluorophenyl)piperazine and 0.1 part of potassium iodide in 120 parts of toluene is heated for 72 hours at a temperature of 145–150° C. The reaction mixture is cooled and then treated with 500 parts of water and 750 parts of ether. The ether solution is separted, dried over anhydrous potassium carbonate, and filtered. Dry hydrogen chloride gas is passed through the solution and a semisolid precipitate results. After decanting the solvent, the crude product is recrystallized from a mixture of 2-propanol and methanol to yield two crops of crystals. These are combined and dissolved in 400 parts of boiling water, whereupon an excess of sodium hydroxide solution is added. An oil separtes and solidifies on cooling to room temperature. The crude base is collected on a filter and recrystallized from ethanol to yield 1-[γ-(2-thenoyl)propyl]-4-(4-fluorophenyl)piperazine melting at about 82.5–83° C.

To a solution of 3.2 parts of 1-[γ-(2-thenoyl)propyl]-4-(4-fluorophenyl)piperazine in 120 parts of absolute ethanol is added 0.13 part of sodium borohydride portionwise at 19° C. Stirring is continued for 3 hours. The mixture is decomposed by the portionwise addition of 200 parts of 2-N hydrochloric acid, cooled to about 15° C., made alkaline with 200 parts of 1-N sodium hydroxide, and diluted to a total volume of 2,000 parts. After chilling at 0° C. the precipitate formed is filtered, dissolved in ether, and filtered again to remove impurities. After concentrating to initiate precipitation, the filtrate is chilled at 0° C. The precipitate formed is filtered and dried to yield the crude 1-(2-thienyl)-4-[4-(4-chlorophenyl)piperazine]butanol. After recrystallization from a mixture of acetone and water, the white crystalline powder of the pure product melts at about 109.2–110° C.

Example 8

In an open flask a mixture of 9.4 parts of 2-(γ-chlorobutyryl)thiophene and 19.6 parts of 1-(2-chlorophenyl)piperazine is heated for 10 hours at a temperature of 110° C. Upon treatment with ether, the oily layer of the reaction mixture solidifies. The solid residue is collected on a filter and extracted with boiling diisopropyl ether. The ether solution is washed with water, dried over anhydrous potassium carbonate, and filtered. Dry, gaseous hydrogen chloride is introduced into the solution, whereupon an oily hydrochloride is formed which solidifies in a mixture of acetone and 2-propanol on standing at —15° C. In the manner there is obtained 1-[γ-(2-thenoyl)propyl] - 4 - (2 - chlorophenyl)piperazine hydrochloride melting at about 202.5–203° C.

From the hydrochloride the free base of 1-[γ-(2-thenoyl)propyl] - 4 - (2 - chlorophenyl)piperazine is liberated by dissolving 6 parts of the salt of 2,000 parts of water, rendering the solution basic, extracting with 600 parts of ether, drying the extract over potassium carbonate, filtering, and evaporating the solvent to yield the free base as an oil. The oil is dissolved in 60 parts of absolute ethanol and 0.3 part of sodium borohydride is added portionwise at 20° C. to the solution. Stirring is continued for 3 hours. The mixture is decomposed by the portionwise addition of 80 parts of 2-N hydrochloric acid, made alkaline with 20% sodium hydroxide, diluted to a volume of 1000 parts, and extracted with ether. The ethereal extract is dried over potassium carbonate, filtered, and evaporated to a small volume. After chilling at —15° C. for five days, a precipitate forms which is filtered and dried to yield the white microcrystalline base of 1-(2-thienyl) - 4 - [4 - (2-chlorophenyl)piperazine]-butanol melting at about 85.5–87.5° C.

Example 9

A mixture of 9.4 parts of 2-(γ-chlorobutyryl)-thiophene and 19.6 parts of 1-(3-chlorophenyl)piperazine is heated in an open flask for 10 hours at a temperature of 105–110° C. After cooling to room temperature, the mixture is triturated with 750 parts of water and 600 parts of ether. The mixture is then filtered, and the residue is recrystallized from a mixture of 2-propanol and water at —15° C. to yield the first crop of 1-[γ-(2-thenoyl)propyl]-4-(3-chlorophenyl)piperazine melting at about 103.6–104.6° C. A second crop is obtained by evaporating the ether solution and recrystallizing the residue from ether.

To a mixture of 280 parts of absolute ethanol, 80 parts of 2-propanol, and 160 parts of methanol, are added 5 parts of 1-[γ-(2-thenoyl)propyl]-4-(3-chlorophenyl)piperazine and 0.2 part of sodium borohydride with stirring. The stirring is continued for 90 minutes after which the mixture is decomposed by the portionwise addition of 160 parts of 25% hydrochloric acid and made alkaline with 5% sodium hydroxide. The precipitate is filtered and recrystallized from a mixture of acetone and water by chilling at 0° C. to yield the white amorphous powder of 1-(2-thienyl)-4-[4 - (3 - chlorophenyl)piperazine]-1-butanol melting at about 81.5° C.

Example 10

A mixture of 9.4 parts of 2-(γ-chlorobutyryl)-thiophene and 19.7 parts of 1-(4-chlorophenyl)piperazine is heated for 10 hours at a temperature of 105° C. The mixture is extracted with 500 parts of water and 400 parts of ether. The ether layer is separated, dried over anhydrous potassium carbonate, filtered, and evaporated. The residue is recrystallized from 2-propanol to yield 1-[γ-(2-thenoyl)propyl]-4-(4-chlorophenyl)piperazine melting at about 94.5–96.5° C. 1-[β-(2-thenoyl)ethyl]-4-(4-chlorophenyl)piperazine is made in an analogous manner and melts at about 82.2–83.6° C.

To a solution of 5.7 parts of 1-[β-(2-thenoyl)ethyl]-4-(4-chlorophenyl)piperazine in 160 parts of absolute ethanol, is added 0.4 part of sodium borohydride portionwise at 22° C. Stirring is continued for 3 hours at 20° C. The mixture is decomposed with 75 parts of 2-N hydrochloric acid, made alkaline, and diluted with water to a total volume of 500 parts. After cooling for 3 hours at 0° C., a precipitate forms which is filtered and recrystallized from diisopropyl ether by chilling at 0° C. for 8 hours. The white amorphous powder of 1-(2-thienyl)-3-[4-(4-chlorophenyl)piperazine]propanol melts at about 98–99° C.

Example 11

To a solution of 3.7 parts of 1-[γ-(2-thenoyl)-propyl]-4-(4-chlorophenyl)piperazine in 150 parts of absolute ethanol cooled to 18° C., is added 0.2 part of sodium borohydride, portionwise. Stirring is continued for three hours. After decomposition with 80 parts of 2-N hydrochloric acid at 20° C., 100 parts of water are added and the mixture is made alkaline with 5% sodium hydroxide. After dilution to a total volume of 1000 parts, the mixture is stored at 0° C. and the precipitate formed is then filtered. It is recrystallized from acetone by chilling at —15° C. to yield the pale yellow microcrystalline powder of 1-(2-thienyl)-4-[4-(4-chlorophenyl)piperazine]butanol melting at about 110–111.9° C.

What is claimed is:
1. A compound of the formula

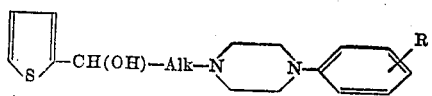

wherein R is a member of the class consisting of hydrogen, methyl, and halogen and Alk is a lower alkylene radical.

2. A compound of the formula

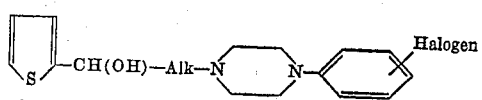

wherein Alk is a lower alkylene radical.

3. 1-(2-thienyl)-4-[4-(4 - fluorophenyl) - piperazine]-butanol.

4. 1-(2-thienyl)-4-[4-(2 - chlorophenyl) - piperazine]-butanol.

5. A compound of the formula

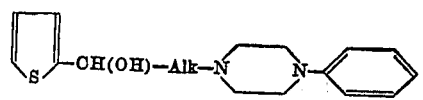

wherein Alk is a lower alkylene radical.

6. 1-(2-thienyl)-4-(4-phenylpiperazine)-1-butanol.

7. A compound of the formula

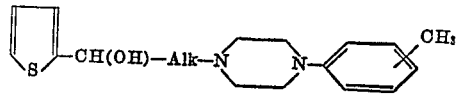

wherein Alk is a lower alkylene radical.

References Cited in the file of this patent
Craig et al.: Australian J. Chemistry, vol. 8, pages 378–384 (1953).